United States Patent [19]

Parizot et al.

[11] 4,412,975

[45] Nov. 1, 1983

[54] FIRED PROCESS HEATER

[75] Inventors: William D. Parizot; Paul D. O'Lenick, both of Katy; Lowell D. Fraley, Sugarland, all of Tex.

[73] Assignee: Pullman Incorporated, Chicago, Ill.

[21] Appl. No.: 331,485

[22] Filed: Dec. 17, 1981

Related U.S. Application Data

[62] Division of Ser. No. 166,880, Jul. 8, 1980, Pat. No. 4,324,649.

[51] Int. Cl.³ .............................................. B01J 19/24
[52] U.S. Cl. ................................. 422/197; 122/235 C; 122/356; 196/110; 208/78; 208/132; 422/198; 585/652
[58] Field of Search ................. 422/197; 208/130, 132, 208/78; 585/652, 925; 122/240, 356, 235 C; 196/110, 116

[56] References Cited

U.S. PATENT DOCUMENTS

| 2,342,011 | 2/1944 | Rickerman | 122/356 |
|---|---|---|---|
| 2,625,916 | 1/1953 | Barnes | 122/240 R |
| 2,625,918 | 1/1953 | Lumly | 122/356 |
| 2,721,735 | 10/1955 | Permann | 122/235 R |
| 2,825,313 | 3/1958 | Born et al. | 122/356 |
| 3,066,656 | 12/1962 | Hensel | 122/240 R |
| 3,182,638 | 5/1965 | Lee et al. | 122/356 |
| 3,385,269 | 5/1968 | Breckenridge | 122/356 |
| 3,671,198 | 6/1972 | Wallace | 422/197 |

OTHER PUBLICATIONS

Perry et al.; *Chemical Engineers' Handbook*, 5th Ed.; McGraw-Hill, N.Y.; pp. 9-34 to 9-38.

Hottel et al.; "The Effect of Gas Flow Patterns on Radiative Transfer in Cylindrical Furnaces"; *Heat Mass Transfer*, vol. 8, pp. 1153-1169.

Mekler, L. A.; "Process Design of Tubular Heaters", Transactions of ASME, Jul., 1956, pp. 1103-1111.

*Primary Examiner*—Richard L. Chiesa

[57] ABSTRACT

Combustion gas passes upwardly through the radiant section of a fired process heater having vertical tubes in such manner that the gas is in predominantly back-mixed flow condition in the lower portion of the radiant section and predominantly plug-flow condition in the upper portion of the radiant section.

4 Claims, 5 Drawing Figures

FIRED PROCESS HEATER

This is a divisional of application Ser. No. 166,880, filed July 8, 1980 now U.S. Pat. No. 4,324,649.

This invention relates to fired, tubular furnaces for heating hydrocarbons. More specifically, the invention relates to a process and apparatus for heating hydrocarbons in furnaces employing vertical tubes wherein combustion gas is passed upwardly through the radiant chamber of the heater or furnace.

Vertical tube, fired heaters are well known in the petroleum and chemical process industries and are utilized to heat hydrocarbon feed streams in a variety of processes such as distillation, thermal cracking, visbreaking, and, of particular interest here, steam cracking and steam reforming.

Heater design is governed by the objectives of the particular process as well as the general objective of high furnace efficiency, that is, the amount of heat absorbed by the process fluid divided by the heating value of fuel input to furnace. For general discussion of process furnace design, see Perry and Chilton, "Chemical Engineers Handbook", Fifth Edition, McGraw-Hill Book Company, pp. 9-34 to 9-38.

Usually, a particular process will require a specific fluid temperature at the furnace tube outlet as well as a defined fluid temperature profile along the length of the tube. Steam reforming and steam cracking furnaces typify this circumstance.

In, for example, a steam cracking furnace which employs a double-fired, single row, vertical, serpentine, tube coil in a conventional radiant chamber (see FIG. 1), a very high, uniform heat flux from combustion gas to process fluid is utilized to bring the fluid quickly to a cracking temperature in the range of from about 815° C. to about 925° C. The high, uniform heat flux requirement is normally achieved through use of back-mixed combustion gas conditions throughout the radiant chamber, that is, approximating a well-stirred reactor. In turn, the back-mixed combustion gas condition is brought about by turbulent heat input from a plurality of burners mounted in the radiant chamber enclosure. A conventional arrangement for achieving this is through use of sidewall burners in optional combination with floor burners in a box type radiant chamber wherein combustion gas passes upwardly through the radiant chamber to a convection section.

Regrettably, the existence of high heat flux throughout the radiant chamber aggravates the known tendency of steam cracking feeds to lay down coke in the tube coil—particularly proximate the coil outlet where process fluid approaches the limit of conversion and has little remaining capacity to absorb heat. In this region, high heat flux causes excessively high tube wall temperatures which result in tube damage and accelerated rates of coke laydown. Furthermore, poor utilization of available heat results in correspondingly poor furnace efficiency.

Analogous problems are found in other high temperature hydrocarbon heating services. In steam reforming furnaces, for example, tube overheating from utilization of high heat flux throughout the radiant chamber results in catalyst damage with resultant poor feedstock conversion and, ultimately, tube damage.

It is an object of this invention to control tube wall temperature profile in a fired process heater and gain furnace efficiency that is otherwise lost through use of back-mixed combustion gases throughout the radiant chamber.

According to the invention, a process and apparatus are provided for heating hydrocarbons by indirect heat exchange with combustion gas in the radiant chamber of a fired tubular heater having a plurality of straight, vertical, tubular heat exchange means in single pass heat exchange relationship with the combustion gas wherein the combustion gas passing over the lower portions of the tubular heat exchange means is predominantly in a back-mixed, ie.—well-stirred, flow condition and the combustion gas passing over the upper portions thereof is predominantly in a plug-flow condition, ie.—substantially each gas particle having approximately the same residence time.

Figure 3:
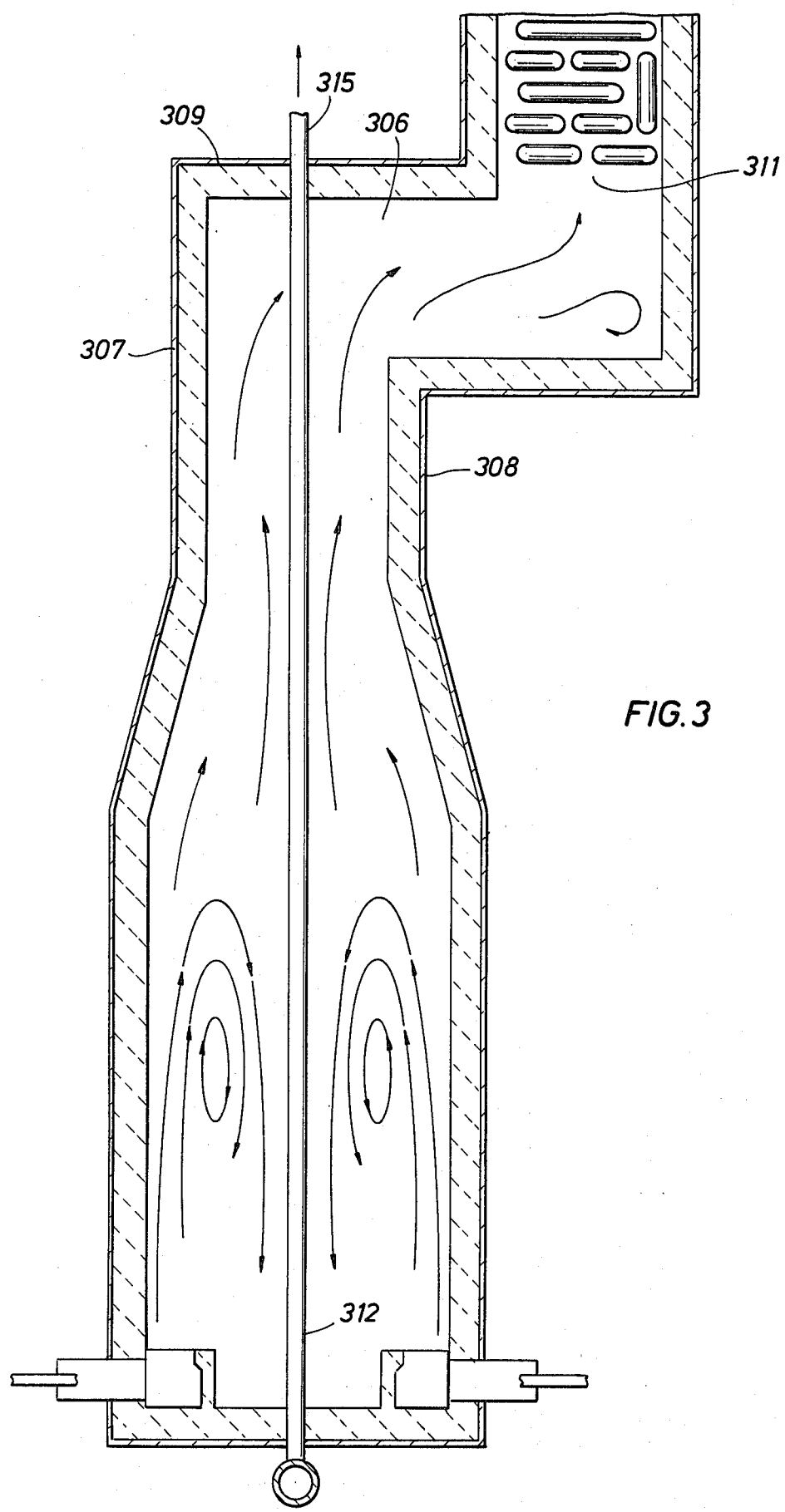
FIG. 3 is the same as FIG. 2 except that the upper portion of the radiant chamber has two, parallel, opposed, upper side walls.
Figure 4:
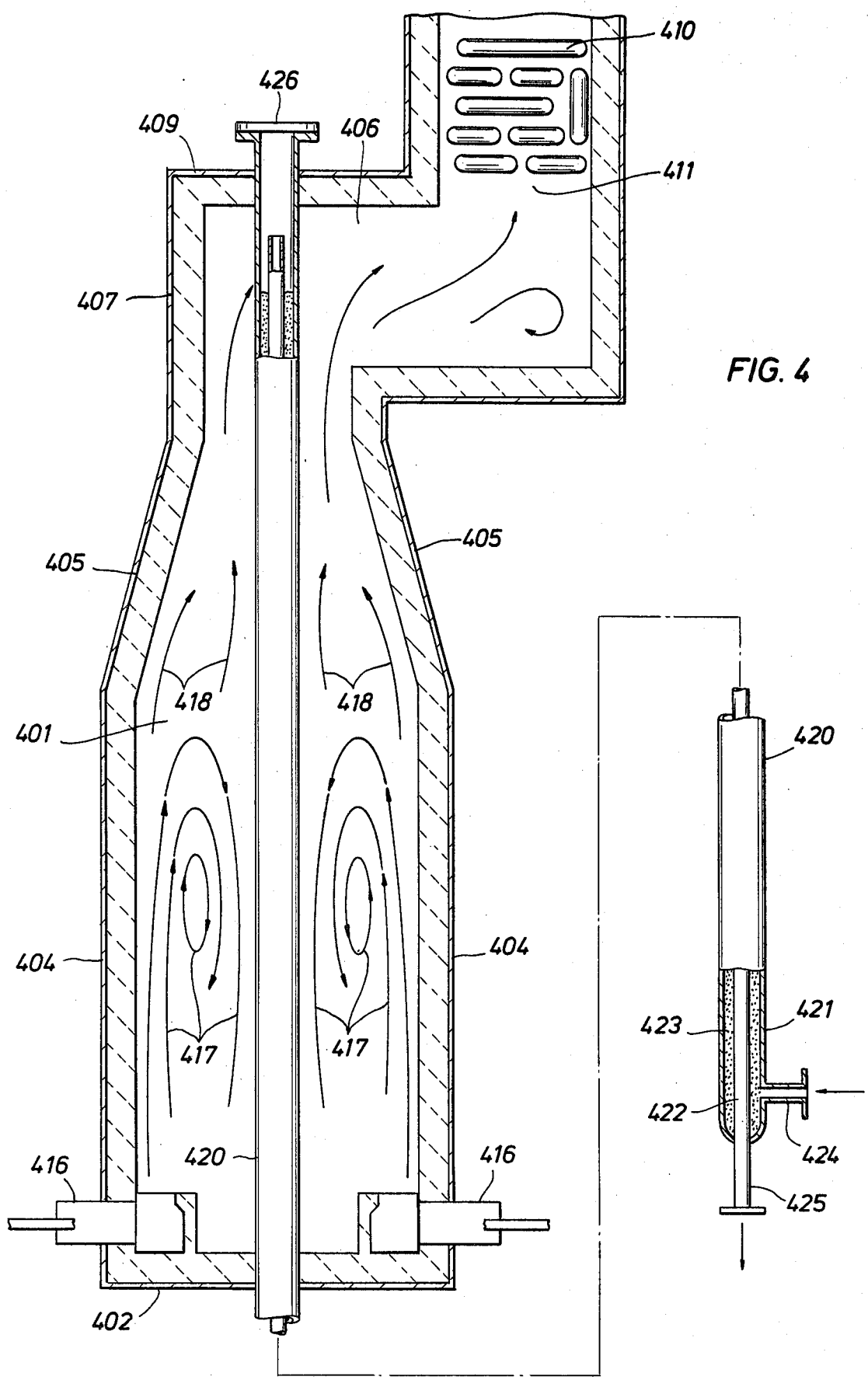

FIG. 4 is a cross-sectional view of another process heater of the invention which employs bayonet type tubular heat exchange means, ie.—two concentric tubes, having only a single pass in heat exchange relationship with the combustion gas but two passes on the process fluid side. As in FIGS. 2 and 3, the burner placement and radiant chamber configuration result in predominantly back-mixed gas flow conditions in the lower portion of the radiant chamber and predominantly plug-flow conditions in the upper portion thereof.

Figure 1:
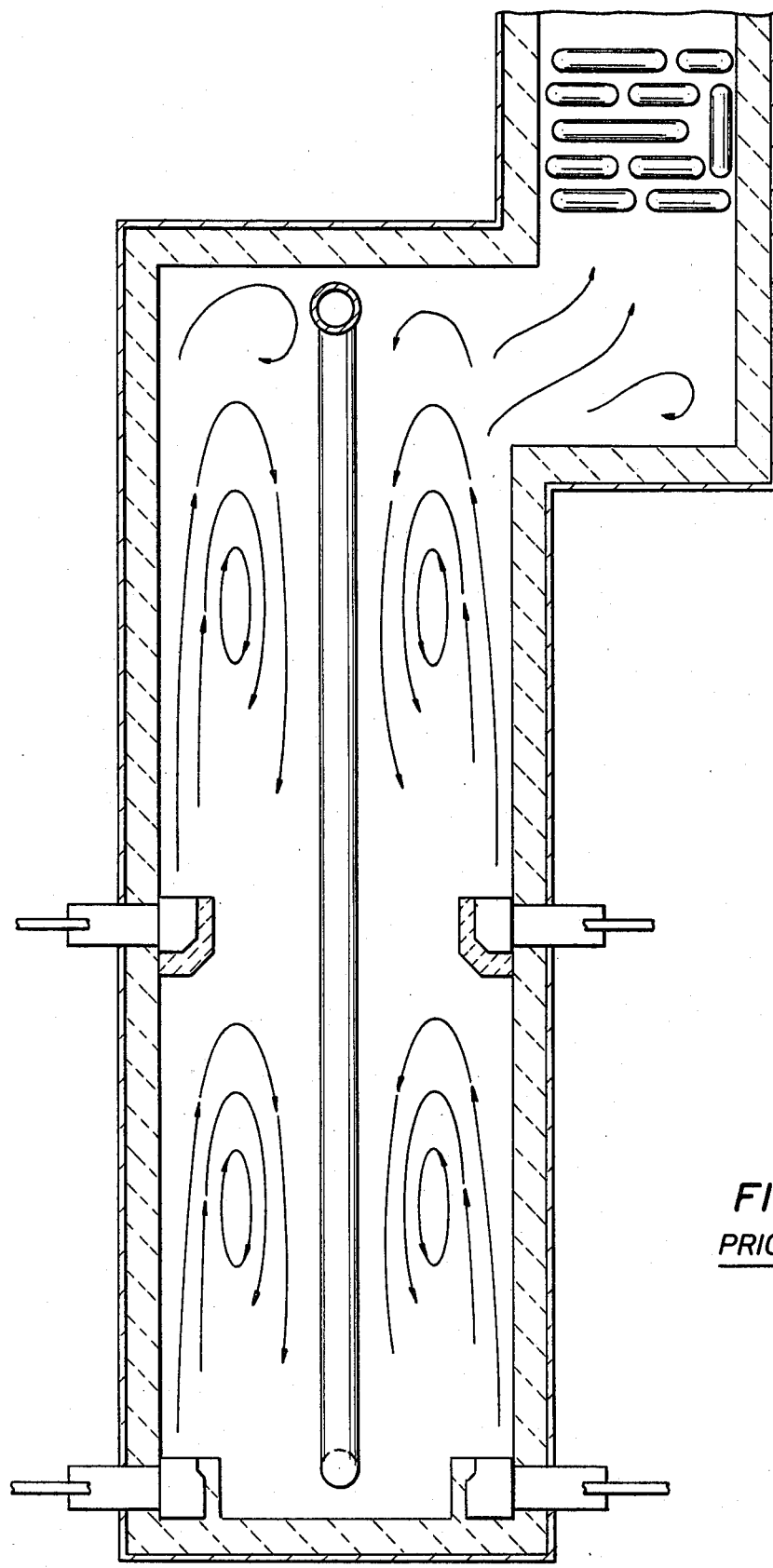
FIG. 1 is a cross-sectional view of a commercial prior art process heater employing a vertical serpentine coil and shows the back-mixed combustion gas flow conditions throughout the radiant chamber which result from the burner placement and geometry of the chamber.
Figure 2:
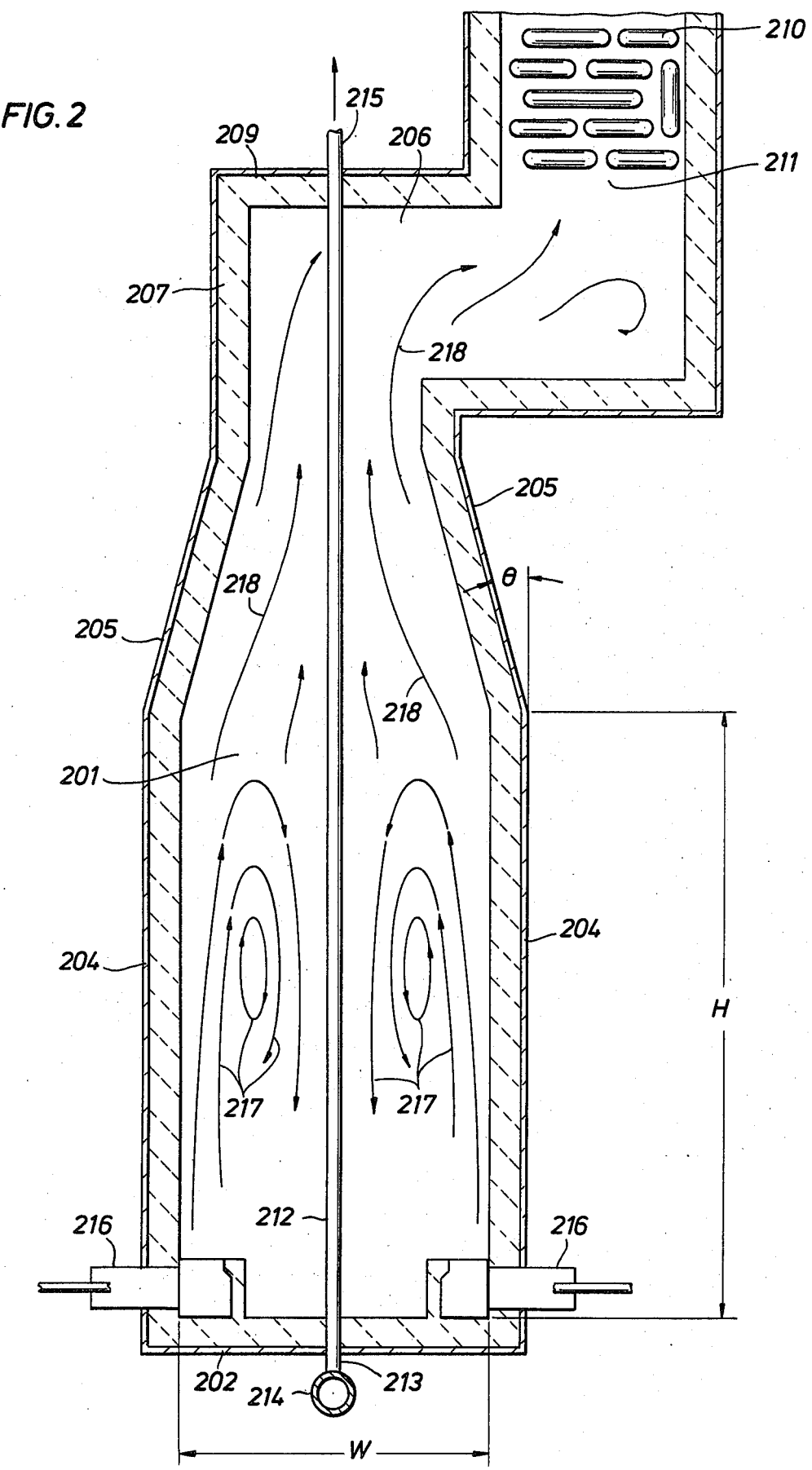
FIG. 2 is a cross-sectional view of a process heater of the invention which employs single pass vertical tubes in combination with burner placement and radiant chamber geometry that result in back-mixed gas flow conditions in the lower portion of the radiant chamber and plug-flow conditions in the upper portion thereof.
Figure 2A:
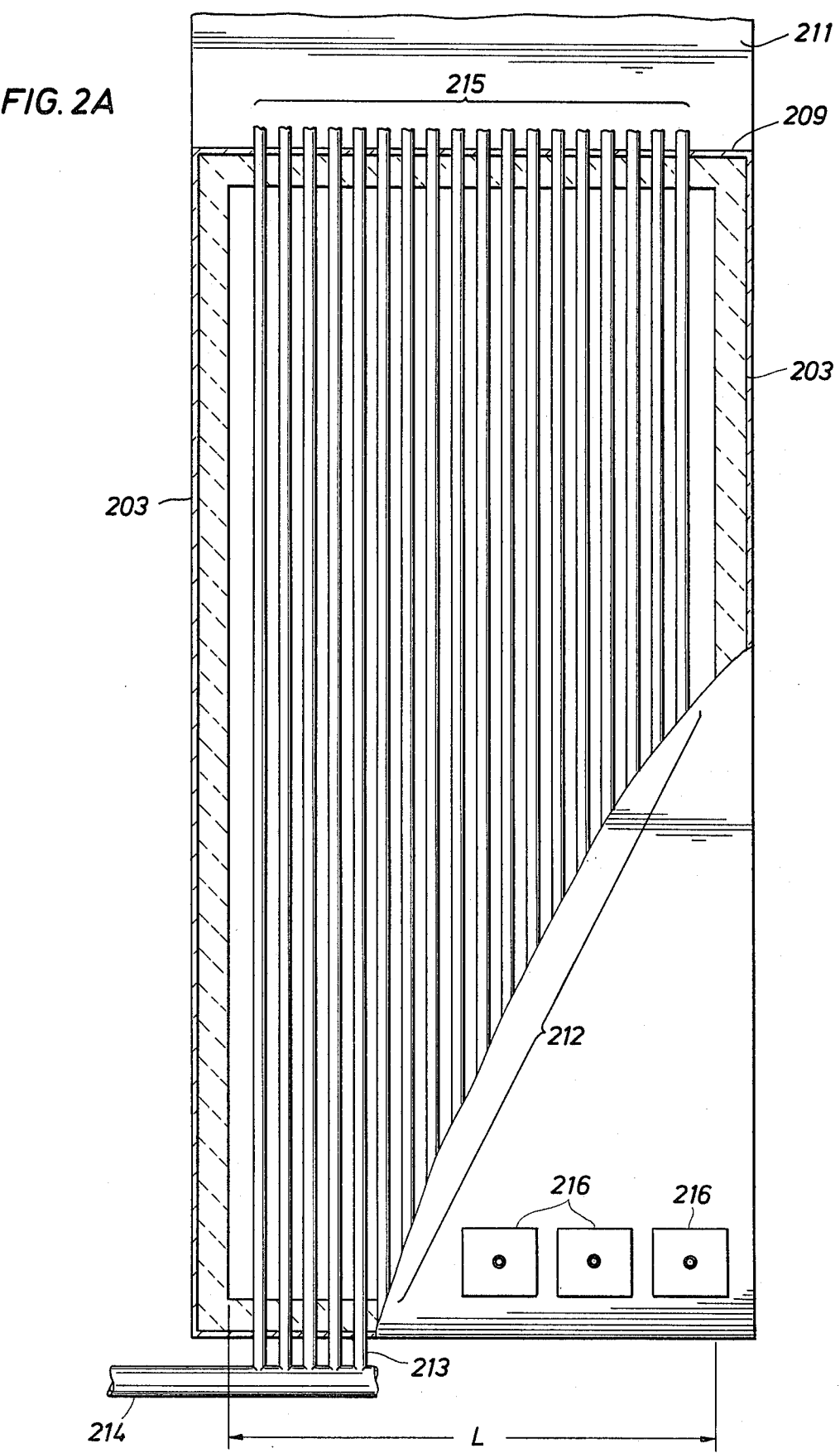
FIG. 2A is a side view of FIG. 2 and illustrates single pass, vertical tubes.

Referring now to FIG. 2, there is shown a fired, tubular, process heater which is particularly useful for steam pyrolysis of hydrocarbon feedstocks including ethane, propane, naphtha and light through heavy gas oils to produce lower olefins and co-products. Radiant chamber 201 is formed by horizontal floor 202, opposed vertical end walls 203 (see FIG. 2A) contiguous with the floor, opposed vertical lower side walls 204 that are contiguous with the floor 202 and end walls 203, opposed intermediate side walls 205 contiguous with end walls 203 and lower side walls 204 and which slope inwardly at an angle from about 10 to about 30 degrees, preferably from about 10 to about 20 degrees, from a plane projected by upward extension of the lower side walls. The upper portion of radiant chamber 201 has combustion gas outlet means 206 which is contiguous with end walls 203 and intermediate side walls 205. In FIG. 2, the combustion gas outlet means 206 is formed by an extension of end walls 203, a single upper side wall 207, and roof 209. The combustion gas outlet means 206 is a passageway constructed in form suitable for directing combustion gas across convection coils 210 located in convection chamber 211 where relatively low level heat is recovered from the flue gas. In FIG. 2, this passageway is an opening of rectangular cross-section.

The radiant chamber 201, encloses a plurality of straight, vertical, tubular heat exchange means 212 which are disposed centrally within radiant chamber 201 parallel to the lower side walls 204, extending through floor 202 and roof 209, and terminating at their upper extremity proximate combustion gas outlet means 206. In FIG. 2, the tubular heat exchange devices are single tubes having a single pass on the process fluid side as well as on the combustion gas side. In steam pyrolysis applications, these tubes are preferably from about 1.8 to about 5.1 cm inside diameter which is suitable for high severity cracking in very short residence times. Regardless of the service, hydrocarbon feedstock is introduced to lower extremities of the tubes proximate floor 202 via tube inlets 213 which, in turn, are fed from inlet manifold 214 via inlet pigtails (not shown). Depending upon the particular service, tube inlets 213 and inlet manifold 214 may be located within radiant chamber 201. Process fluid is heated in its upward passage through the tubes and discharged at their upper extremities via tube outlets 215 proximate combustion gas outlet means 206. In many services, heated process fluid is collected in an outlet manifold similar to inlet manifold 214. In steam pyrolysis service, tube outlets 215 are closely coupled to cracked gas quench devices which may utilize direct or indirect cooling. Preferably, from one to four tube outlets discharge into a single quench exchanger. Without departing from the scope of the invention, tubes 212 may be branched within radiant chamber 201. For example, two tubes may be joined at one third the height of the radiant chamber and then joined with another pair of tubes at two thirds the height of the radiant chamber with the result of one tube outlet for every four tube inlets.

The heater is so configured that hot combustion gas proximate to and passing over the lower portions of tubular heat exchange means 212 is in a predominantly back-mixed flow condition 217 and is at a substantially uniform temperature. As the combustion gas passes upwardly through the radiant chamber, intermediate side walls 205 channel the gas into predominantly plug-flow condition 218 proximate the upper portions of tubular heat exchange means 212 as it passes over them and the combustion gas decreases in temperature as it passes upwardly.

Preferably, the physical proportions of the radiant chamber are selected such that:

$$H/2(1/W+1/L) \leq 2.5$$

where L is the length of the lower side walls between the end walls (see FIG. 2A), H is the height of lower sidewalls, and W is the width of the radiant chamber between the lower side walls. The size limitations on W and L in the foregoing relationship provide uniformity in back-mixed gas flow conditions throughout the lower portion of the radiant chamber and thereby avoid unbalanced heat flux in this region.

A fuel/air mixture is introduced to a plurality of burners 216 proximate floor 202 in the lower portion of the radiant chamber which are disposed to direct combustion gas therefrom upwardly into the chamber in indirect heat exchange relationship with tubular heat exchange means 212 and the process fluid therein. Preferably, no burners are mounted in the end walls 203, lower side walls 204, intermediate side walls 205, and combustion gas outlet means 206 since a large amount of combustion gas introduced to the radiant chamber at locations other than proximate the floor will tend to extend the region of back-mixed gas flow upwardly into the region of desired plug-flow conditions. Despite this preference, small wall burners may be utilized in the upper portion of the radiant chamber provided that their combustion gas discharge does not appreciably disrupt plug-flow of combustion gas in the upper portion.

In operation of the heater of FIG. 2 as a steam cracking furnace for the selective production of ethylene from hydrocarbons, back-mixed flow of hot combustion gas at the lower portions of tubes 212 containing relatively cool process fluid results in a uniform radiation pattern and high heat flux of from about 6800 to about 16,000 calories/hr/cm$^2$. These conditions are desired to meet the heat absorption demands of high severity, short residence time cracking.

As noted previously, utilization of high heat flux as process fluid approaches conversion limits results in tube overheating and laydown of coke in the cracking tubes. This problem is substantially overcome by the present invention in that the upper portions of the tubes containing relatively hot process fluid are subjected to lower heat flux in the range of from about 1300 to about 4100 calories/hr/cm$^2$. The lower heat flux is brought about by use of predominantly plug-flow combustion gas conditions in the upper part of the radiant chamber. Since combustion of fuel is substantially complete as gas enters the upper part of the chamber, heat is depleted from the gas as it flows upwardly in plug-flow and heat flux decreases correspondingly.

In the above-described service, the ratio of heat fluxes between the lower and upper extremities of the cracking tubes proximate respectively roof 209 and floor 202 is from about 3 to about 7.

Accordingly, the introduction of heat proximate the tube inlets at their lower extremities under back-mixed combustion gas flow conditions, in combination with heat absorption proximate the tube outlets at their upper extremities under predominantly plug-flow combustion gas conditions permits control of temperature profile over the tube length while maintaining high thermal efficiency of the furnace.

FIG. 3 is the same as FIG. 2 except that combustion gas outlet means 306 is comprised of upper side wall 308 in addition to end wall extensions 303 (not shown), roof 309, and upper side wall 307 which is opposed and parallel to upper side wall 308. This configuration effectively extends the region of combustion gas plug-flow and also results in higher ratio of convective to radiant heat transfer in the upper portion of the radiant chamber.

Referring now to FIG. 4, reference numbers 401 through 411 and 416 through 418 correspond respectively to FIG. 2 reference numbers 201 through 211 and 216 through 218.

FIG. 4 illustrates an embodiment of the invention having bayonet type tubular heat exchange means 420 which are useful for, among other things, catalytic steam reforming of hydrocarbons ranging from methane through heavy gas oil to produce hydrogen-containing gas, for example, synthesis gas. As previously noted, control of temperature profile over the process fluid route within reformer tubes is quite critical. The present invention is well suited to meet this requirement.

Tubular heat exchange devices 420 are comprised of outer tube 421 and one or more inner tubes 422 to form a space for containment of catalyst 423 which is loaded through closure 426. Suitable means (not shown) are employed at the bottom of the catalyst space for catalyst removal. Outer tube 421 is fitted with a hydrocarbon feed inlet 424 at the lower extremity thereof and inner tube(s) 422 are in fluid communication with product gas outlet 425 at their lower extremities. Upper extremities of inner tubes 422 are in fluid communication with the catalyst space so that process fluid process upwardly through the catalyst bed in single pass heat exchange relationship with combustion gas in radiant chamber 401 and then downwardly within inner tubes 422 in heat exchange relationship with the upwardly flowing fluid in the catalyst space.

The bayonet exchange devices 420 extend through radiant chamber 401 and extend downwardly outside the radiant chamber where, in the absence of hot combustion gas, they function as feed/effluent heat exchangers.

We claim:

1. A fired tubular heater which comprises:
(a) a radiant chamber for passage of combustion gas having a floor, opposed vertical end walls contiguous with the floor, opposed planar vertical lower side walls contiguous with the floor and the end walls, opposed intermediate side walls contiguous with the end walls and the lower side walls, the intermediate side walls sloping inwardly from the lower side walls, at least one upper side wall contiguous with the end walls and one of the intermediate side walls and, a roof contiguous with the end walls and an upper side wall, the end walls, lower side walls, intermediate side walls, upper side walls, and roof having no burners;
(b) a plurality of straight, vertical, tubular heat exchange means having a single pass in heat exchange relationship with the combustion gas which are parallel the lower side walls, disposed centrally within and extend through the radiant chamber, and terminate at their upper extremities proximate the roof; and
(c) a plurality of burners proximate the floor which are disposed to direct combustion gas upwardly into the radiant chamber.

2. A fired tubular heater for steam pyrolysis of hydrocarbons which comprises:
(a) a radiant chamber for passage of combustion gas having a floor, opposed vertical end walls contiguous with the floor, opposed planar vertical lower side walls contiguous with the floor and the end walls, opposed intermediate side walls contiguous with the end walls and the lower side walls, the intermediate side walls sloping inwardly from the lower side walls, at least one upper side wall contiguous with the end walls and one of the intermediate side walls and, a roof contiguous with the end walls and an upper side wall, the end walls, lower side walls, intermediate side walls, upper side walls, and roof having no burners;
(b) a plurality of straight, vertical, single-pass tubes parallel the lower side walls disposed centrally within and extending through the radiant chamber, each of the tubes having a fluid inlet proximate the floor and a fluid outlet proximate the roof; and
(c) a plurality of burners proximate the floor which are disposed to direct combustion gas upwardly into the radiant chamber.

3. The heater of either claim 1 or 2 wherein the lower side walls have a length L, a height H, and are spaced apart by a width W and the relationship of L, H, and W is defined by:

$$H/2(1/W+1/L) \leq 2.5.$$

4. The heater of either claim 1 or 2 having two upper side walls contiguous with the end walls and the intermediate side walls.